June 12, 1956 E. A. NEWMAN ET AL 2,750,499
CIRCUITS FOR ULTRASONIC DELAY LINES
Filed Jan. 8, 1951 2 Sheets-Sheet 1

Edward Arthur Newman
David Oswald Clayden
Inventors
By Stevens, Davis, Miller & Mosher
their Attorneys

CIRCUITS FOR ULTRASONIC DELAY LINES

Filed Jan. 8, 1951 2 Sheets-Sheet 2

Inventors
Edward Arthur Newman
By David Oswald Clayden
Stevens, Davis, Miller & Mosher
their Attorneys 2,750,499
Patented June 12, 1956

2,750,499

CIRCUITS FOR ULTRASONIC DELAY LINES

Edward Arthur Newman, Teddington, and David Oswald Clayden, Hanwell, London, England, assignors to National Research Development Corporation, London, England, a British corporation Application January 8, 1951, Serial No. 205,005

Claims priority, application Great Britain January 14, 1950

3 Claims. (Cl. 250—27)

The invention relates to electronic storage systems which depend on a timed distribution of electrical pulses to represent the information stored. One well-known method of storing such information is to insert the timed series of pulses into a suitable delay medium. A commonly used delay medium is a mercury delay line. In such a line, if it takes a time T for one pulse to travel the length of the line and the pulse spacing is $t$ then at any particular instance the delay stores $$\frac{T}{t}$$

pulses.

In the timed distribution of electrical pulses information of two kinds is represented, one kind being represented by the presence of a pulse and the other kind by the absence of a pulse. The train of pulses to be stored is applied to an oscillatory circuit each pulse being caused to modulate a carrier oscillation generating circuit to set up a corresponding pulse of carrier oscillation which travels down the delay line and is converted back into an ordinary pulse at the output of the delay line. The bursts of oscillations are started by the leading edge and stopped by the trailing edge of each pulse. The greater part of the energy used in this type of storage device is used in starting and stopping oscillations. In view of the order of timing, the carrier frequency being about 20 megacycles per second, the pulse repetition frequency being 1 megacycle, and the pulse-width being a fraction of a microsecond, in order to preserve a reasonable pulse shape the leading and trailing edges of the envelope of the oscillation must rise and fall rapidly, i. e. in not more than one cycle of the carrier oscillation.

The invention may employ two different forms of two-state circuits which give potential outputs at one of two levels according to the state of the circuits. The first is called a flip-flop circuit and has a stable state from which it can be changed by a suitable triggering pulse but to which it reverts after a predetermined time called the time of operation. The second circuit, hereinafter called a trigger, has two stable states and may be switched from one state to the other by a suitable triggering pulse. Both of these circuits are well known broadly as triggering circuits.

It is an object of the present invention to provide a method of storing information which involves the expenditure of considerably less energy by starting and stopping oscillations only when there is a change between successive pulses, i. e. when a pulse occurs after one or more "no pulses" or when "no pulse" occurs after one or more pulses.

One of the advantages of this method of storage is that oscillations will have to be started and stopped less frequently than if a pulse of oscillations were sent down the line for every input pulse, consequently a smaller valve may be used in the driving circuits and the valve may be driven much harder since the mean current will be small.

According to the present invention there is provided a method of storing information represented by a temporal pattern of electrical pulses having an underlying constant time of repetition, the method being characterised in that each pulse is widened until its duration is substantially equal to the said time so that two or more pulses occurring consecutively coalesce before they are applied to a storage device such as a mercury delay line.

According to one feature of the invention there is provided a method of storing information wherein said information is of two kinds, the first kind represented by the presence of a pulse in a timed distribution of pulses and the second kind represented by the absence of a pulse in said timed distribution of pulses, said method including the feature of employing the leading edge of a pulse to start an oscillation representing information of the first kind, said oscillation being stopped by the trailing edge of the first pulse in the series which is followed by the absence of a pulse in a position representing information of a second kind.

According to a further feature of the invention there is provided apparatus for storing information of two kinds, the first kind represented by the presence of a pulse in a timed series of electrical pulses and the second kind represented by the absence of a pulse in said timed series of electrical pulses, comprising a first trigger circuit fed with a timed series of electrical pulses representing the information to be stored and a second trigger circuit co-operating with said first trigger circuit in such a way that the sum of the outputs from said first and second trigger circuits is a voltage waveform, the level of which changes from a first level to a second level only when the type of information represented by said timed series of electrical pulses changes from said first kind to said second kind and from said second level to said first level only when the type of information represented by first timed series of pulses changes from said second kind to said first kind.

In order that the invention may be more clearly understood reference will be made to the accompanying drawings in which Figure 1 is a block diagram of one embodiment of a storage device according to the present invention;

Figure 4:
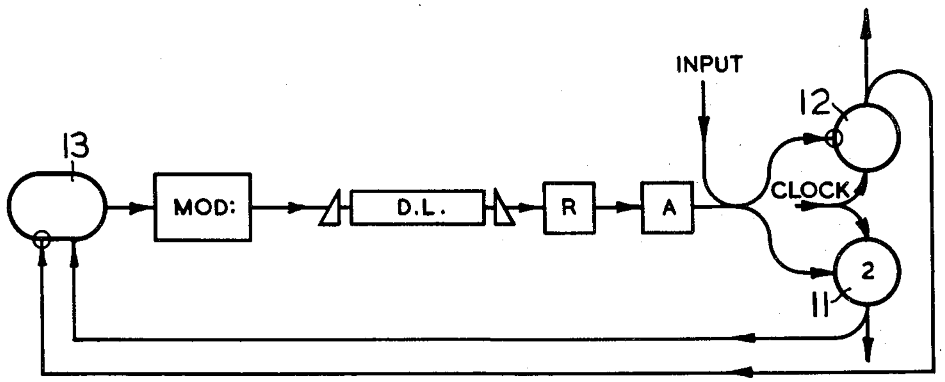
Figure 4 shows another embodiment of the invention.

Some of the symbols shown in Figure 4 are described together with their electronic circuit equivalents in copending U. S. application Ser. No. 202,615, filed December 26, 1950, by James H. Wilkinson, now Patent No. 2,686,632, granted August 17, 1954.

The information is represented by a train of pulses of pulse repetition frequency of 1 megacycle per second and pulse width 0.3 microsecond approximately. The digit 1 is represented by a pulse of 0.3 microsecond duration, the digit 0 by "no pulse."

Figure 1:
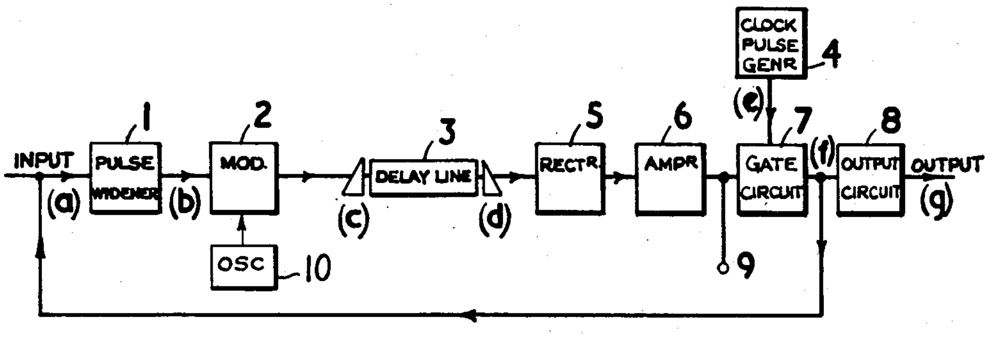
Figure 2:
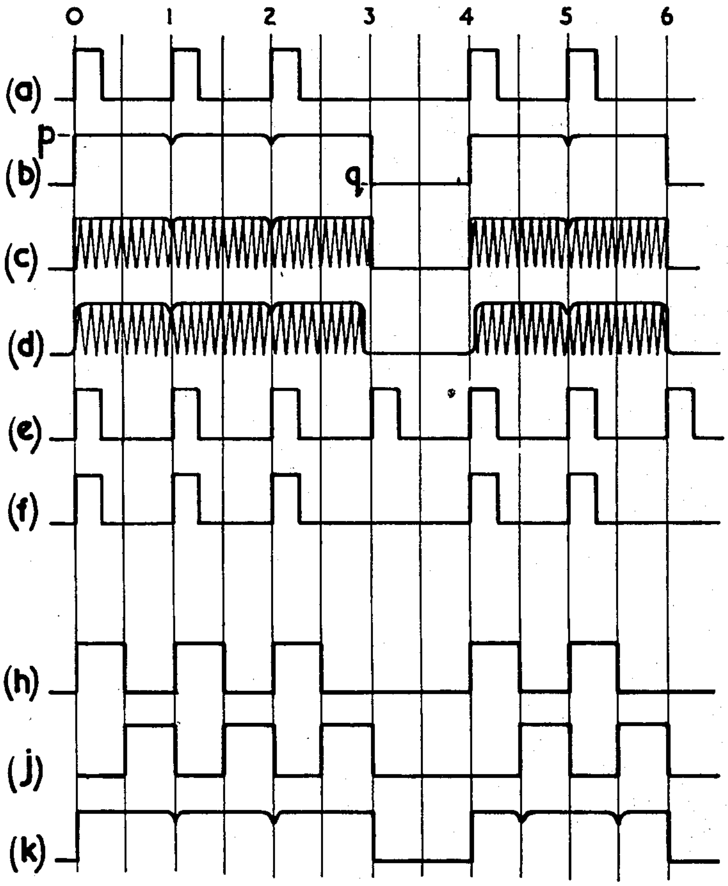
Figure 2 shows various waveform associated with the storage device.

In Figure 1 the information to be stored is fed into a pulse widening circuit 1. An example of this information is shown in Figure 2($a$) in which it is seen that there are two kinds of information represented by the presence and absence of a pulse respectively. The pulses having an underlying constant time of repetition that is to say they can only start, if at all, at times represented by the equally spaced time ordinates 0, 1, 2, 3 etc. The pulse widener produces an output of a form shown in Figure 2($b$) in which the voltage level changes from one level $p$ to another level $q$ when a pulse is followed by the absence of a pulse in the next pulse period and the voltage level changes from $q$ to $p$ when a pulse follows "no pulse."

Therefore, a series of consecutive pulses is represented by a constant voltage level and a series of "no pulses" is represented by a different voltage level (which may be zero).

The output shown at Figure 2(*b*) is fed into the modulator 2 which is also fed by the carrier-wave oscillator 10 and which produces an output of the form shown at Figure 2(*c*). This is fed into the delay line 3 and reaches the other end of the delay line in the mis-shapen form shown in Figure 2(*d*). Here it is rectified by means of a suitable rectifier 5, e. g. a germanium crystal. In order to regenerate the train of pulses the delay line is made slightly shorter than the exact number of pulse periods for which it is intended to delay a pulse train and the rectified output from the germanium crystal 5 is amplified by an amplifier 6 and is fed into a gate circuit 7. This gate circuit 7 is also fed with clock pulses, at regular pulse intervals, of the form shown in Figure 2(*e*). The gate circuit operates only when it receives a clock pulse and a pulse at the level *p* from the delay line and it produces a pulse whenever such co-incidence occurs. The new train of pulses Figure 2(*f*) is fed back to the pulse widener 1 for further storage or may be taken out of the store through the output circuit 8, alternatively the output may be taken from terminal 9.

Figure 3:
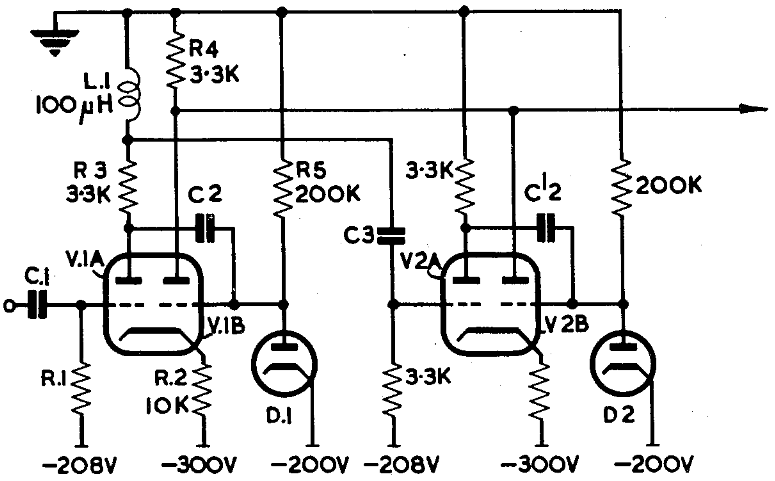
Figure 3 is a circuit diagram of a pulse widening circuit for use in such a storage device.

One form of the pulse widener circuit 1 of Figure 1 is shown in Figure 3. The pulse widener comprises two tandem-connected trigger circuits (V1A, V1B, V2A and V2B), having one state of stability to which they revert after a predetermined time when they have been triggered. Such trigger circuits are usually known as flip flop circuits, as defined above. The first flip flop produces in response to each applied pulse a widened pulse occupying approximately half of a digit period and the second trigger circuit which is operated by the trailing edge of each pulse produced by the first trigger circuit producing a further widened pulse occupying the second part of each digit period. It will thus be apparent that at the conclusion of every digit period the first trigger circuit will be in its quiescent state and ready to be actuated by a digit pulse which may be present and the widening action of the circuit is such that each digit pulse may be widened to occupy the whole digit period.

The information to be stored is fed through the condenser $C_1$ on to the control grid of V1A which may be one half of the double triode (V1A and V1B). The grid of V1A is connected through a resistance $R_1$ to a source of negative potential of −208 volts. The common cathode of V1A and V1B is connected through a resistance $R_2$ to a source of negative potential of −300 volts. The anode of V1A is taken to earth through a resistance $R_3$ and an inductance $L_1$. The anode of V2B is taken to earth through a resistance $R_4$. The grid of V1B is taken through a diode $D_1$ to a source of negative potential of −200 volts and through a resistance $R_5$ to earth. The anode of V1A is connected to the grid of V1B through a condenser $C_2$. The junction of $R_3$ and $L_1$, is joined to the control grid of a valve V2A through a condenser $C_3$. V2A is one half of a second double triode (V2A and V2B) which is connected to operate as a flip flop in a similar manner to V1A and V1B. The anodes of V1B and V2B are connected to form a common output terminal.

The operation of the circuit is as follows: In the quiescent state V1B is conducting and V1A is not conducting owing to the relative grid voltages. The condition of V2A and V2B is similar. The application of a positive going pulse (representing a digit 1) to the grid of V1A results in the leading edge of the pulse causing V1A and V1B to be triggered into a condition in which V1A is conducting. The selection of the time constant of the flip flop is such that V1A reverts to its quiescent state after half a microsecond giving an output at V1B as shown in Figure 2(*h*).

The anode potential of V1A drops and the condenser $C_2$ starts to charge until both V1A and V1B start to take current than the trigger reverts back to its initial quiescent condition. The diode $D_1$ limits the grid voltage of V1B to −200 volts and the charge in $C_2$ returns to the quiescent value via the anode load of V1A and the diode $D_1$. The value of the condenser $C_2$ is chosen so that the trigger takes ½ microsecond to revert to the state in which V1A is non-conducting that is to say the time constant of the flip-flop is ½ microsecond. The condenser reverts to its quiescent state in much less than a further ½ microsecond so that the flip-flop V1A and V1B is ready to receive another pulse occurring 1 microsecond after the first.

When the valve V1A reverts to its non-conducting state a positive pulse is generated at the junction of $L_1$ and $R_3$ and this is passed, via the condenser $C_3$, to the flip flop V2A—V2B which goes through a cycle similar to that gone through by V1A—V1B so that the anode of V2A gives out a ½ microsecond pulse in alternate half cycles when the input at $C_1$ is a pulse, as shown at Fig. 2(*j*). The total output at V1B and V2B anodes is the sum of the waveforms at Figure 2(*h*) and Figure 2(*j*) and is shown at Figure 2(*k*).

The circuit shown in Figure 3 has been described as operating with positive pulses applied and yielding positive pulses at the output. It can, however, easily be modified to work with negative pulses applied and to yield negative pulses at the output. The required modification consists in reversing the diodes $D_1$, $D_2$, reversing the bias conditions on the valves V1A, V1B and V2A, V2B, for example, by connecting the grid resistor of the valves V1A, V2A to −192 volts instead of −208 volts. The cathodes of the diodes $D_1$ and $D_2$ reversed should then be connected not to earth but to −300 volts and the resistance $R_5$ should be 100 k. ohms instead of 200 k. ohms.

The condenser $C_2$ and $C_2'$ are adjusted so that the time constant of each flip flop is ½ microsecond and this is a convenient arrangement. The essential factor is, of course, that the sum of the time constants is 1 microsecond, i. e. the inter-digit time.

Figure 5:
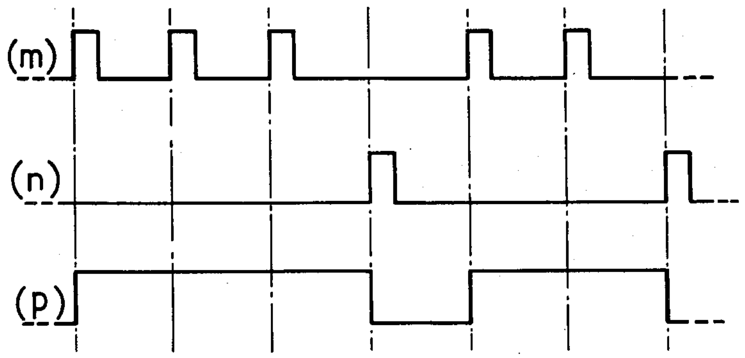
Figure 5 shows waveforms associated with the circuit in Figure 4.

An alternative embodiment of the invention is illustrated in Figure 4. In this case, the input is applied to an end gate 11 and at an inhibiting input to the gate 12. The gates 11 and 12 are also fed with clock pulses so that the output from the gate 11 is the input word and the output from the gate 12 is the input word negated. The output from the gate 11 is used to put the trigger 13 on and the output from the gate 12 is used to put the trigger 13 off. In this case the trigger 13 is not a flip flop but a normal trigger circuit having two stable states. The output from the trigger 13 is fed to the modulator and operates in the same way as the output from the pulse widener 1 shown in Figure 1. The output from the device may be taken from the gate 11 and a negated output is also available at the gate 12. The operation of the circuit will be clear when the wave forms shown in Figure 5 are considered. In this figure (*m*) represents an input word, (*n*) represents the input word negated and (*p*) represents the output of the trigger 13.

What we claim is:

1. Apparatus for storing information, said information being represented by a series of electrical pulses, the times between successive pulses being whole number multiples of a basic pulse period that comprises a means to feed each of said pulses to a first trigger circuit having at least one stable state, biased to be triggered by the leading edge of a pulse, the time constant of said first trigger circuit being such as to produce a first trigger pulse having a pulse duration substantially equal to one-half said basic pulse period, means to feed said first trigger pulse to a second trigger circuit biased to be triggered by the trailing edge of said first trigger pulse, the time constant of said second trigger circuit being such as to produce a second trigger pulse similar in duration to said first trigger pulse, means to add said trigger pulses to produce a lengthened pulse of a duration substantially equal to said basic pulse period, a carrier-wave oscillator, means to supply said lengthened pulses to said oscillator to cause said oscillator to generate a carrier wave when triggered by the leading edge of said lengthened pulses and to stop so generating when stopped by the trailing edge of said lengthened pulses, means to feed the resultant carrier wave to a storage device for electrical energy.

2. Apparatus as defined in claim 1 further including a gating circuit, means to rectify said resultant carrier wave, means to supply said rectified signals to said gating circuit, means to also supply clock pulses to said gating circuit at a pulse repetition frequency equal to 1, said basic pulse period whereby when said clock pulses and the portions of said rectified signal corresponding to said lengthened pulses arrive at said circuit simultaneously, said gating circuit produces said original series of information pulses.

3. Apparatus for storing digital information in the form of electrical pulses having a basic pulse period, comprising means for lengthening each of said pulses until it exists during the whole of its pulse period so that two consecutively occurring pulses just coalesce, a storage delay line having an input terminal and an output terminal, an oscillator feeding the input terminal of said delay line, means for modulating said oscillator by the pulses lengthened by said first-mentioned means, and means for rectifying the output from the said delay line.

References Cited in the file of this patent

UNITED STATES PATENTS

| | | |
|---|---|---|
| 2,402,916 | Schroeder | June 25, 1946 |
| 2,414,479 | Miller | Jan. 21, 1947 |
| 2,416,368 | Young | Feb. 25, 1947 |
| 2,430,139 | Peterson | Nov. 4, 1947 |
| 2,480,038 | Mason | Aug. 23, 1949 |
| 2,525,634 | Atwood et al. | Oct. 10, 1950 |
| 2,535,266 | Chance | Dec. 26, 1950 |
| 2,545,567 | Bridges | Mar. 20, 1951 |
| 2,567,846 | Jacobsen | Sept. 11, 1951 |
| 2,641,700 | Hoeppner | June 9, 1953 |